March 7, 1967 A. W. JACOBS 3,307,223
INJECTION MOLDING MACHINE
Filed March 25, 1964 5 Sheets-Sheet 1

INVENTOR.
ARTHUR W. JACOBS
BY
Oberlin, Maky & Donnelly
attorneys

March 7, 1967  A. W. JACOBS  3,307,223
INJECTION MOLDING MACHINE
Filed March 25, 1964  5 Sheets-Sheet 4

INVENTOR.
ARTHUR W. JACOBS
BY
Oberlin, Maky & Donnelly
attorneys

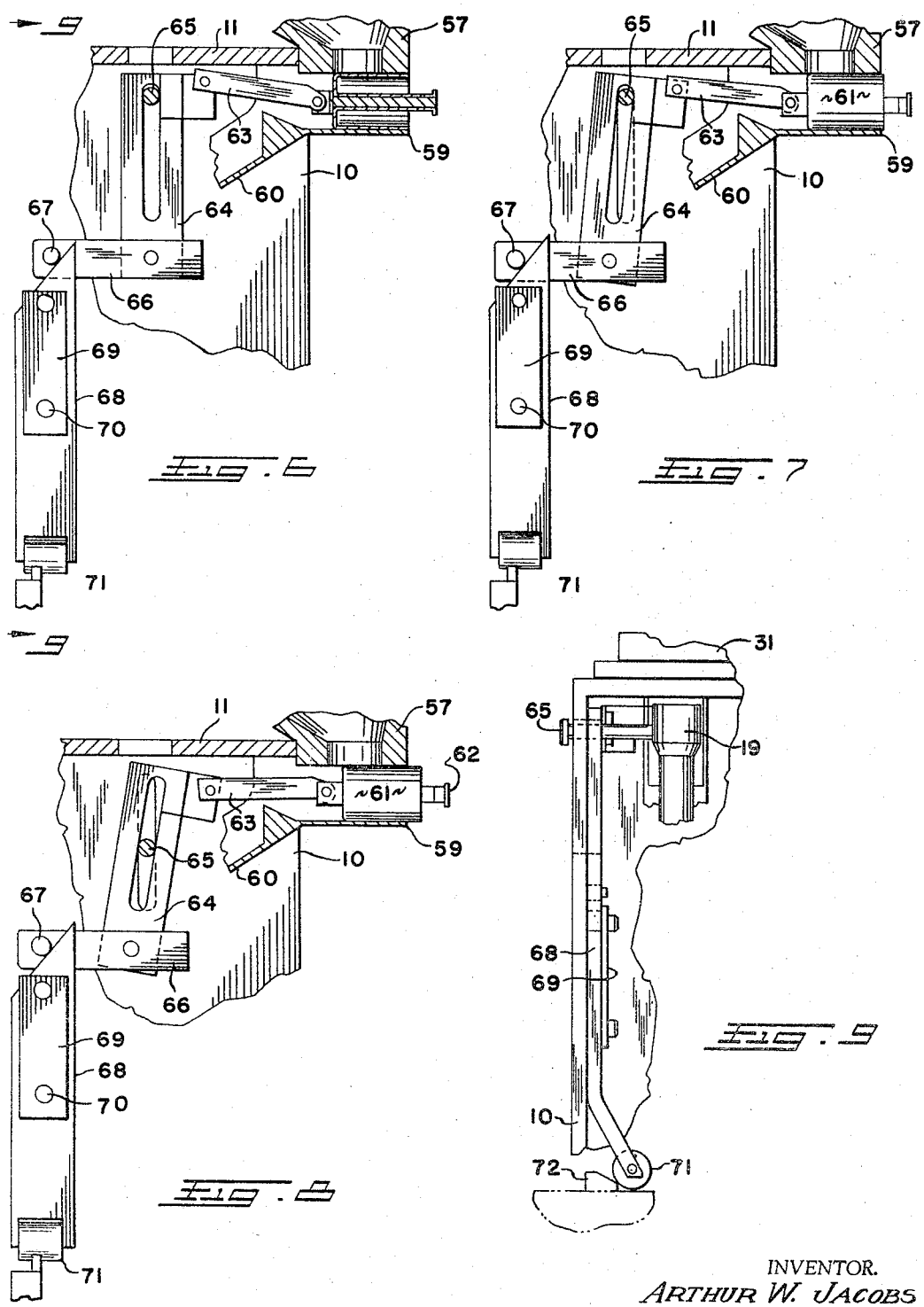

United States Patent Office 3,307,223
Patented Mar. 7, 1967

3,307,223
INJECTION MOLDING MACHINE
Arthur W. Jacobs, 5994 Columbia Road,
North Olmsted, Ohio 44070
Filed Mar. 25, 1964, Ser. No. 354,548
10 Claims. (Cl. 18—30)

The present invention relates to an injection molding machine and, more particularly, to improved apparatus for injection molding having novel aspects affecting the loading of the cylinder, the processing of material through the cylinder, and the moving of receiving molds with respect to the injection cylinder.

The injection molding of various parts has become increasingly important commercially over the past few years. Such technique is particularly popular for the molding of relatively small parts such as gears, washers, grommets, handles, trays, and the like. The principal object of the present invention is to provide injection molding apparatus which is highly flexible in application and yet produces quality castings at a relatively large volume capacity.

Another object is to provide injection molding apparatus having a metering device wherein the amount of charge for a subsequent injection molding operation is automatically measured and delivered to the injection cylinder.

A further object is to provide an improved injection cylinder which operates at relatively low molding pressures and has high heating efficiencies.

A still further object is to provide injection molding apparatus capable of producing at substantially the same time two differently shaped molded articles.

A still further object is to provide improved means for moving mold-retainers or molds with respect to an injection cylinder and, preferably, improved means for shuttling a pair of mold-retainers or molds between an operative, engaging position with respect to the cylinder and an inoperative, non-engaging position.

Other objects of the invention will become apparent as the description proceeds.

To the accomplishment of the foregoing and related ends, the invention consists of the features hereinafter fully described and particularly pointed out in the claims, the annexed drawings and following disclosure describing in detail the invention, such drawings and disclosure illustrating, however, but one or more of the various ways in which the invention may be practiced.

Figure 1:
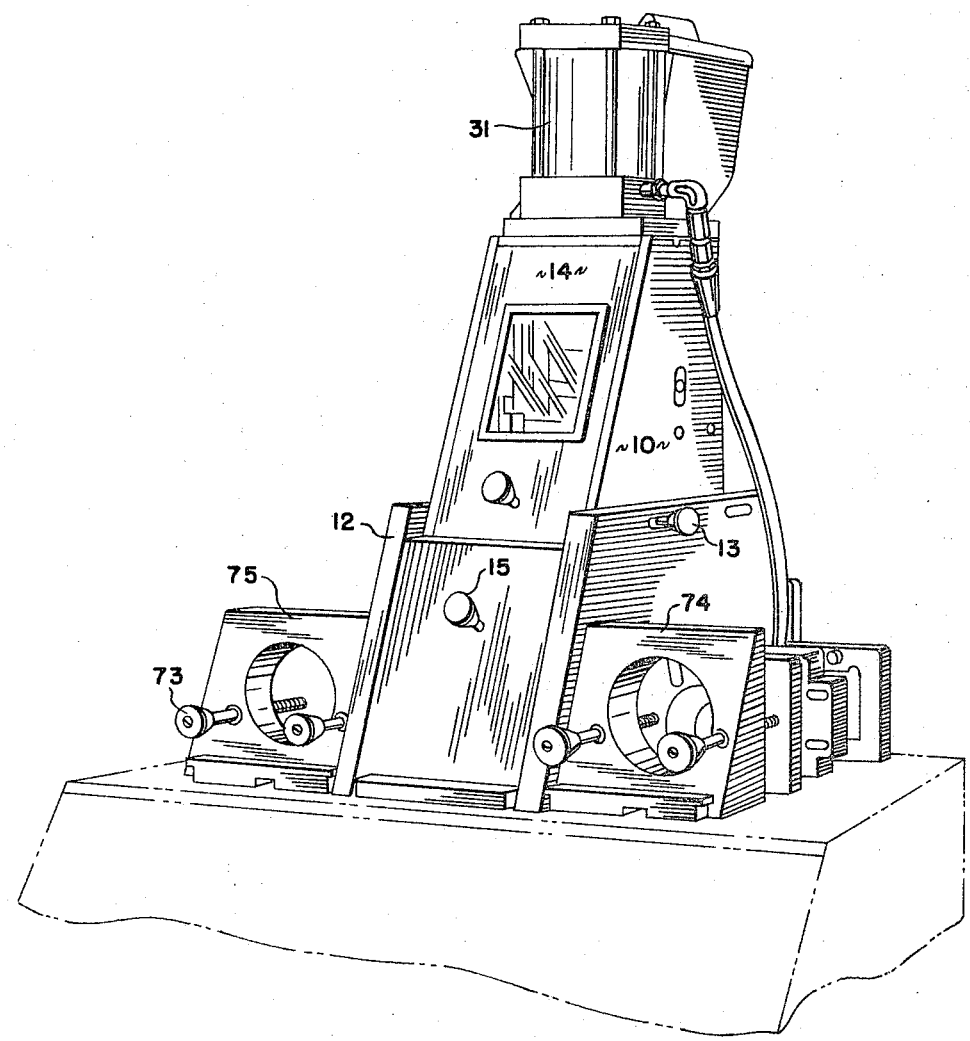
FIGURE 1 is a perspective view of one form of the present injection molding apparatus.

FIGURES 6, 7, and 8 are sequential fragmentary views of a cam-operated metering system of the present apparatus; and FIGURE 9 is a view of FIGURE 6 taken on the plane of the line 9—9.

STRUCTURE

The embodiment illustrated by the figures basically includes (FIGURE 2) an injection cylinder generally indicated at C, mold-retainers and apparatus to reciprocate them beneath the injection cylinder generally indicated at R, and (FIGURE 3) a metering system for feeding the injection cylinder generally designated at M. All of this apparatus, hereinafter described more in detail, are supported over a table T in conjunction with rigid side plates 10 and top plate 11. Suitable side cover plates 12 held in place by set screws 13 may also be used and have openings (together with the side plates 10) to accommodate reciprocal movement of the mold-retainers hereinafter mentioned. Similarly, front cover plates 14 may be removed by knobs 15 to provide ready access to the interior apparatus.

Injection cylinder

Figure 2:
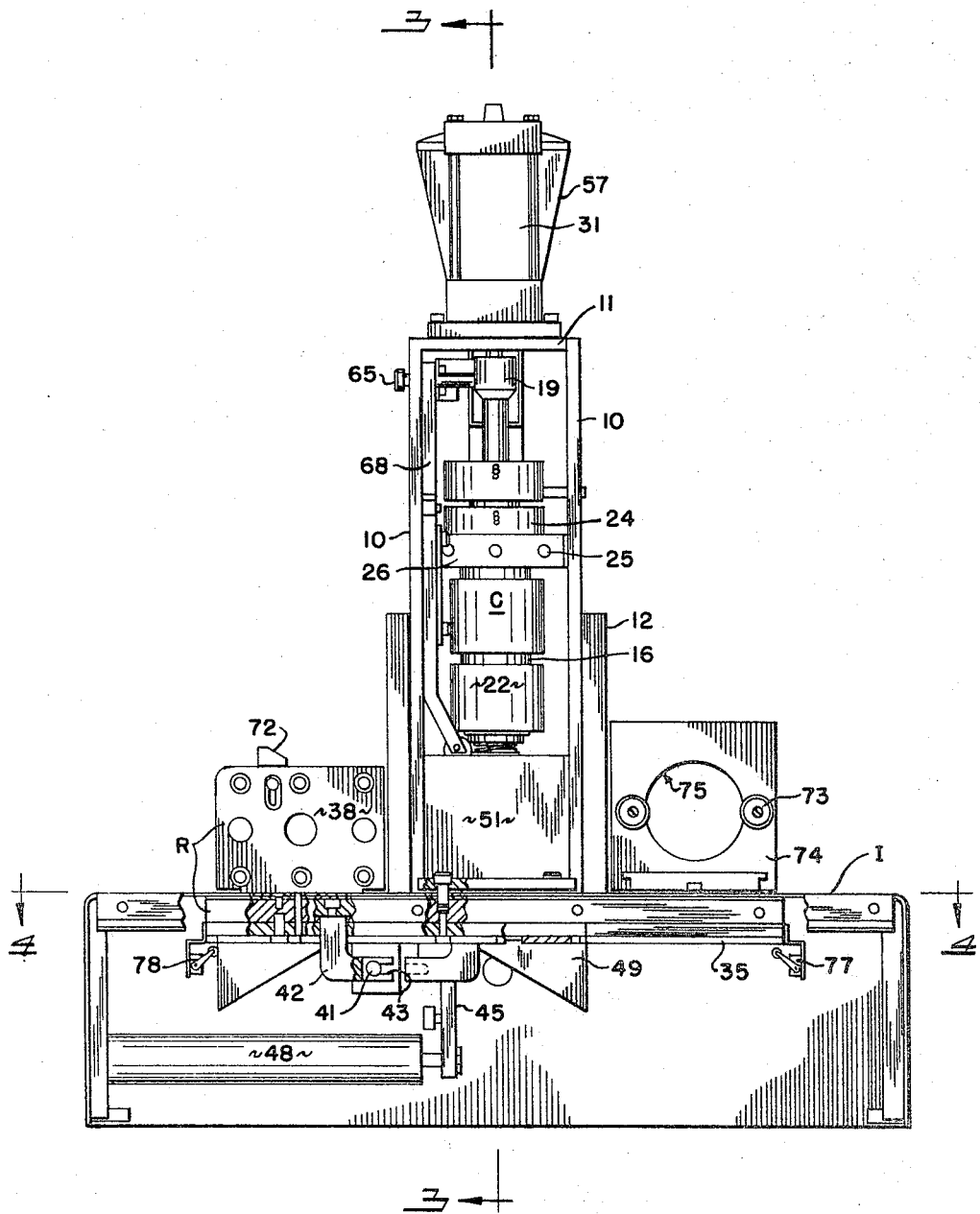
FIGURE 2 is a front elevational view of FIGURE 1, with parts removed and in section, and illustrates a front platen or mold-retainer on one side as well as apparatus for reciprocating the mold-retainers beneath the injection cylinder.
Figure 3:
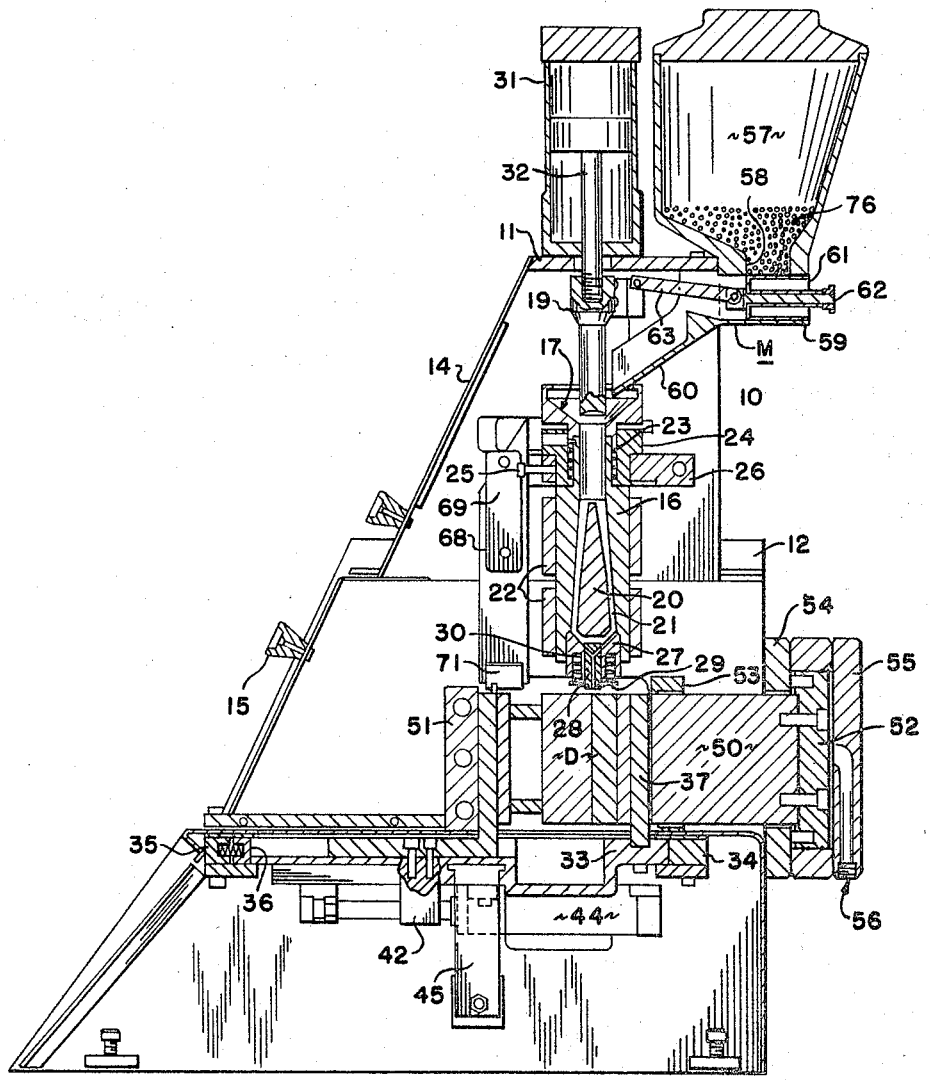
FIGURE 3 is a section of FIGURE 2 on the line 3—3.
Figure 4:
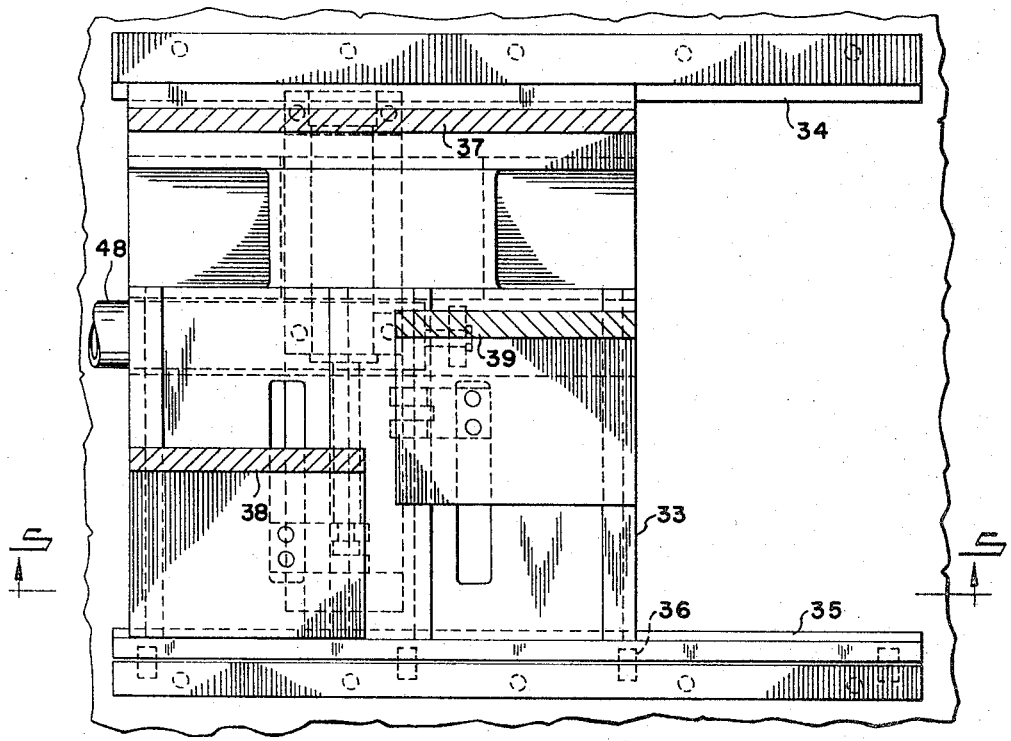
FIGURE 4 is a partial section of FIGURE 2 taken on the plate of the line 4—4.

Referring principally to FIGURES 2 and 3, the injection cylinder includes a tubular body 16, the axial passage of which is frusto-conically shaped at the top end to define a loading chamber 17. Thereafter, the passage narrows to a plunger section 18 which matches in cross section the cross section of a plunger 19. The passage of the body 16 then enlarges and terminates in an exit end. A torpedo 20 is conventionally supported within the enlarged area to leave a relatively thin annular passage 21 between the torpedo 20 and the wall of such enlarged area. In the preferred form, the volume of the relatively thin annular passage 21 is substantially equal to the volume of the loading chamber 17. Electrically-energized heating bands 22 encircle the body 16.

The body 16 of the injection cylinder is resiliently supported for limited axial movement at both ends. At the upper end, the body 16 has an annular circumferential slot into which an axially-compressible spiral spring 23 and collar 24 fit. Pins 25 fix a plate 26 to the collar 24, the plate 26 being supported by the side plates 10. The body 16 is thus free to move vertically with respect to the collar 24, although downward movement is resiliently opposed by the spring 23.

A nozzle comprising a concentric annular ring 27 and plug 28 fit within the exit end of the cylinder. Outer ring 24 is fixed with respect to the body 16, but inner plug 28 is free to move axially. A retainer plate 29 limits the downward movement of plug 28 and also retains a series of six compression springs 30 which seat within corresponding recesses at the outer end of ring 27. The plug 28 has a passage entering from the side of its upper end to constitute a continuation of the passage of the body 16. In its normal outward position, the side entry of the passage of the plug 28 is closed off from the interior of the cylinder due to sufficient outward displacement of the plug; but upon retraction of the plug 28 into the body 16, resiliently opposed by the springs 30, the passage of the plug reaches and can communicate with the interior of the body 16.

The top plate 11 supports a fluid-actuated cylinder 31, which is preferably hydraulically-actuated. A piston rod 32 of this cylinder passes through an opening in the plate 11 and threadably engages the upper end of the plunger or ram 19.

Mold-retainers and reciprocating apparatus

One or two molds may be used with the present apparatus or, more specifically, mold holders or retainers. The latter are permanent parts of the apparatus, permitting the temporary installation of various types of molds depending on the cast articles desired.

Referring principally to FIGURES 2 through 5, a platform 33 or shuttle plate is mounted for reciprocal movement in the direction of its length upon supporting gibs 34 and 35, the latter having an inner runner which is resiliently urged toward the platform 33 by springs 36. The platform 33 carries cooperating platens to which the mating sections of two parting molds may be suitably and conventionally fixed. Preferably, one platen for each mold is fixed with respect to the platform 33, and to this end a single plate 37 is used of sufficient length to cooperate with two movable platens 38 and 39. The latter are generally L-shaped with one side having laterally extending flanges 40 (FIGURE 5) which ride in mating grooves 41 of the platform 33. Accordingly, the movement of the platens 38 and 39 is toward and away from the fixed platen 37, and in a direction transversely of the platform 33, to close and open, respectively, mold sections fixed to such platens.

Each movable platen has an elbow hook 42 which extends through a transverse opening in the platform 33 and terminates in a slot 43. The platform also has on its underside a fluid-operated, preferably hydraulically-operated, cylinder 44 which together with a depending arm 45 is carried by strip 46 (FIGURE 5) adapted for limited free movement relative to the platform 33 and in the direction of the latter's length. A piston rod of cylinder 44 has a button 47 adapted releasably to engage the slots 43 of the hooks 42. An additional fluid-actuated cylinder 48, preferably hydraulically-operated, is held at one end to a side of the table T with its piston rod fixed to the arm 45. At each end of the platform 33, there is a shute 49 to guide away ejected molded articles.

Although the cylinder 44 brings the platens together and therefore the mold sections fixed thereto, claming apparatus stationed above the table T and directly below the injection cylinder C rigidly clamps the platens and mold sections together prior to a molding operation. Such a clamp may take the form (FIGURE 3) of a clamping cylinder 50 and abutment 51. The cylinder 50 is bolted to a pressure plate 52 and guided by rings 53 and 54. An end plate 55 applies fluid under pressure to the pressure plate 52 through an opening 56. The platens which carry a portable mold D make almost sliding contact with the abutment 51 and clamping cylinder 50, so that the latter need have only a very short stroke (for example, 1/16 of an inch) to press together tightly all components between it and the abutment 51.

*Metering system*

The present apparatus is also designed to meter a predetermined amount of the material to be molded into the injection cylinder, preferably as a result of the ram or plunger action. This action may be keyed to the movement of a mold beneath the injection cylinder and is preferably keyed to the shuttle operation of two of such molds.

Referring principally to FIGURES 2, 3, and 6 through 9, the plate 11 also supports a hopper 57 adapted to contain plastic material to be molded. The hopper has an outlet 58 terminating in a discharge cylinder 59. This cylinder has a chute 60 at one end leading to the loading chamber 17 at the entrance of the injection cylinder. A piston 61 in the cylinder 59 normally closes off an outlet 58 as shown in FIGURE 3. The position of piston 61 within the cylinder 59 can be adjusted by means of a turn screw 62 which threadably engages the cylinder. A link 63 relates the action of the piston 61 (through the turn screw 62) to the movement of the plunger 19. Preferably, this interrelation is positively controlled by the apparatus illustrated especially by FIGURES 6 through 9 in a manner to insure that the hopper 57 releases an accurately determined pre-established amount of material.

To this end, the link 63 pivotally joins the piston 61 to a tab portion of another link 64. This link and the left-hand side plate 10 (as viewed in FIGURE 2) each have slots which preferably match. A pin 65 (FIGURE 9) fixed to the plunger 19 freely passes through both slots and tends to keep the slot of link 64 aligned with the slot of side plate 10.

At its lower end, link 64 is also pivotally joined to still another link 66 having a camming pin 67 adjacent one end. Pin 67 rides a beveled end of a substantially vertically disposed actuating arm 68 which is held to the side plate 10 for sliding engagement therewith by an overlying guide plate 69 and pins 70. Arm 68 terminates in a cam wheel 71 which engages a cam 72, mounted on each of the movable platens 38 and 39, when the platens and molds are moved beneath the injection cylinder.

*Operation*

Figure 5:
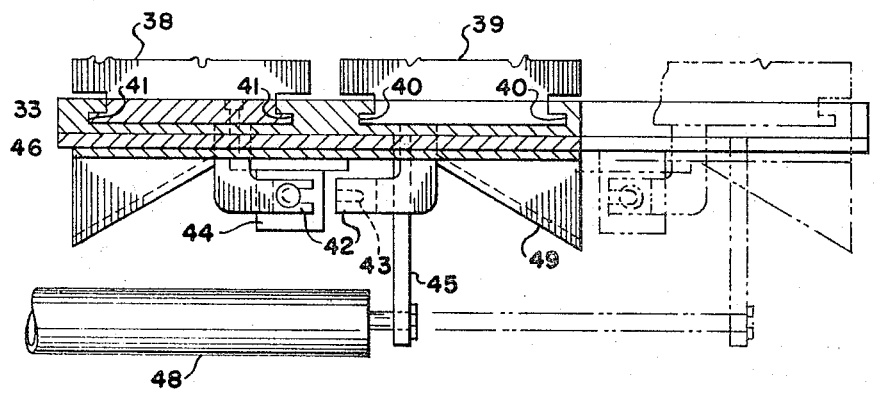
FIGURE 5 is a section of FIGURE 4 taken on the line 5—5 and shows in phantom another position of the movable platform.

Arbitrarily beginning the cycle of operations after an injection molding operation has been completed and the plunger 19 retracted (substantially the situation illustrated by FIGURE 3), the pressure of the spring-returned clamping cylinder 50 is released, and the piston rod of cylinder 48 begins its movement to the right as viewed in FIGURE 2 or 5. Since the arm 45 and cylinder 44 have limited free movement relative to the platform 33 by means of the movable strip 46, the button 47 of the piston rod of cylinder 44 leaves the slot of the elbow hook 42 of platen 38 and transfers to the slot of the companion hook of platen 39. Thereafter, the platform 33 begins its movement to the right, as viewed in FIGURE 5, until it reaches the position illustrated in phantom.

During this action, the cam 72 on platen 38 contacts the wheel 71 and lifts the actuating arm 68 a predetermined distance according to the setting of the cam 72. This action pivots link 64 about the pin 65 to a position left of the vertical as viewed in FIGURE 7. This, in turn, causes a slight displacement of piston 61 so that some of the material from the hopper may be released into the discharge cylinder 59, although this is not important at this juncture that some material be so released.

When the platform 33 reaches the end of its stroke to the left as presently being described and viewed in the figures, the ejection of the molded part as well as the descent of the plunger 19 by cylinder 31 may be simultaneously actuated, for example, by tripping a limit switch 77 fixed to gib 35. This switch actuates a solenoid valve or the like (not shown) to extend the cylinder 44 and move platen 39 away from the back platen 37. Spring-mounted ejecting pins 73 in frontal plates 74 push the molded article from the mold sections and down a chute 49. Alternatively, if the molded article is threaded, an electric motor carried in the openings 75 (FIGURES 1 and 2) rotates a molded section to effect release of the article from the mold without stripping the molded threads.

At the same time, clamping cylinder 50 tightens the newly presented mold sections now beneath the injection cylinder C and the plunger 19 descends, closing off the entrance to the cylinder by fitting within the space 18. This action causes link 64 to move to the position of FIGURE 8, since, as the pin 65 descends, link 64 pivots thereabout forcing the piston 61 further to the right as viewed in FIGURE 7 through the link 63. Thus the presetting of link 64 as shown in FIGURE 7 and the descent of the ram 19 has accumulative effect in moving the piston 61 to the right. This movement, in turn, opens the outlet 58 a predetermined amount and permits a measured quantity of plastic granules 76 to be released from the hopper 57. Such granules may be of a thermoplastic material, such as polyethylene or polystyrene.

The downward thrust of the plunger or ram 19 also moves the body 16 downwardly compressing the spring 23. Further, upon striking the underlying mold, the nozzle plug 28 is forced upwardly into the body 16, compressing the springs 30, but opening the side entry of the passage of the plug 28 to the interior of the body 16. The plunger 19 stops short of the torpedo 20, forcing a previous plastic charge out the nozzle plug and into an operatively engaged mold. Upon upward retraction of the plunger 19, the springs 23 and 30 are released and return the body and nozzle plug 28 to their normal previously described positions. The upward movement of the plunger 19 also returns the piston 61 in the discharge cylinder 59 to its normal position closing off the outlet 58 of the hopper 57. Simultaneously, however, the piston 61 pushes the charge of granules previously metered from the hopper as described down the chute 60 and into the loading chamber 17 of the injection cylinder. As the plunger 19 clears the space 18, the granules drop into the cylinder and are subsequently melted by the heating bands 22 as the material is forced by plunger 19 through the cylinder and around the torpedo 21. Thereafter, the operation as described can be repeated, there being a second limit switch 78 which is tripped by the return of the platform 33, again to actuate cylinder 44 and open the other mold sections. Many of the foregoing sequential steps may be conventionally carried out by standard timers known in the art.

It is emphasized that with two molds it is possible with the present apparatus alternatively to remove one molded article while another is being formed. In short, finished parts are being ejected from one mold while another part is being injected in a companion mold. It will also be noted that two molds lend themselves to the production of two different parts at substantially the same time, that is, two different weights or different wall sections, with molding conditions suitable to each part. In this manner orders for two customers or two orders for the same customer may be molded at the same time.

Further, with respect to differing molds, the present apparatus is equipped to measure two different size "shots" and meter the material for each mold even though of differing volumetric capacity. The necessity for the proper amount of material in a loading chamber is of course of great importance in any injection molding cycle and of even greater importance when automation is contemplated. In the foregoing description, it will be noted that each cam 72 presets the metering device for the size of the next injection molding to be made, namely, not for its mold but for the companion mold. If, however, it is desired to operate the apparatus for one mold only, the cam corresponding to cam 72 can be used on the movable platen for the single operating mold.

Referring now to the injection cylinder itself as employed in this apparatus, the volumetric capacity of what has herein been referred to as the enlarged area relative to the volumetric capacity of the loading chamber is also of prime importance. It has been noted that when these two capacities are substantially the same, internal friction of the granular material is minimized, resulting in a larger percentage of pressure at the exit nozzle for every pound of pressure on the injection ram. Excellent void-free castings have been produced with the present apparatus with injection pressures of 10,000 p.s.i. on the plunger. Injection pressures closely approximating those of a screw type injection machine can also be normally employed. By means of the spring loaded nozzle plug, the latter is easily placed in an open or closed position with respect to the cylinder upon contacting the sprue of a mold. This also contributes to the relatively low contact pressures between the nozzle and the mold.

Other forms embodying the features of the invention may be employed, change being made as regards the features herein disclosed, provided those stated by any of the following claims or the equivalent of such features be employed.

I therefore particularly point out and distinctly claim as my invention:

1. In injection molding apparatus for plastics and the like; a substantially vertically disposed injection cylinder having an entrance loading chamber and an exit opening, said chamber and exit opening communicating with the interior of the cylinder and with each other, ram means adapted to enter the cylinder through the entrance loading chamber and force plastic material to be molded out said exit opening, said ram means being of a cross-sectional size to close said entrance to the injection cylinder, hopper means adapted to contain said plastic material stationed adjacent the injection cylinder, said hopper means having a discharge cylinder provided with piston means normally closing the hopper means, a first link having slot means normally disposed in a generally vertical direction, said first link being supported to permit lateral displacement of its lower end to shift said slot means to inclined position, a second link pivotally joining the first link to said piston means, said ram means having pin means engaging the slot means of the first link effective, upon lateral displacement of the lower end of the first link and subsequent downward and upward travel of the pin means attendant the movement of the ram means into and out of the injection cylinder, to move said piston means respectively to permit a predetermined amount of plastic material to leave the hopper means and enter said discharge cylinder and to displace such predetermined amount of plastic material from said discharge cylinder, and chute means to direct said predetermined amount of plastic material to the loading chamber of the injection cylinder.

2. The injection molding apparatus of claim 1 wherein said first link has means to displace laterally the lower end thereof.

3. The injection molding apparatus of claim 2 further including mold means to be injection molded by said injection cylinder, means to move the mold means into operative engagement with said injection cylinder, and cam means responsive to said movement of the mold means to actuate said laterally displacing means of said first link a pre-established amount.

4. The injection molding apparatus of claim 2 further including a pair of molds adapted alternatively to be injection-filled by said injection cylinder, shuttle means to move one mold into operative engagement with the injection cylinder while moving the other mold away therefrom and vice versa, each mold carrying cam means alternatively engaging an actuating arm mounted for reciprocatory movement, the movement of said arm effecting the displacement of said first link as defined, the cam means for each mold so displacing the first link to establish the predetermined amount of plastic material for the companion mold of the pair.

5. Injection molding apparatus comprising a cylinder having a feed opening for plastic material at one end and an injection nozzle at the other end for flow of such material therethrough into a mold engaged thereby; a first resilient mounting for said cylinder for movement of said cylinder toward a mold for engagement of the nozzle therewith; a second resilient mounting for said nozzle urging the same to a position blocking flow of plastic material therethrough except upon continued movement of said cylinder following engagement of said nozzle with a mold; displacement means in said cylinder effective to apply pressure on plastic material in said cylinder thus to sequentially move said cylinder and nozzle against said first and second resilient mounting means respectively; and stop means to arrest movement of said cylinder after said nozzle has been opened and while the nozzle is engaged with a mold solely by force applied through said second resilient mounting.

6. Injection molding apparatus comprising a mold having an opening through which plasticized material is adapted to be injected into a cavity in said mold; an injection cylinder having an injection nozzle movable therein between open and closed positions; first spring means biasing said cylinder away from said mold to disengage said nozzle from said mold opening; second spring means biasing said nozzle toward said mold to closed position; displacement means in said cylinder to apply pressure on plastic material in said cylinder initially to move said cylinder against said first spring means to engage said nozzle with said mold opening and then to cause said nozzle to move against said second spring means to open position upon continued movement of said cylinder for injection of the thus pressurized plastic material into said mold cavity; and stop means to arrest movement of said cylinder after said nozzle has been opened and while said nozzle is engaged with said mold opening solely by force applied through said second spring means.

7. In injection molding apparatus including an injection cylinder, means for supporting a pair of molds, and means to move the mold supporting means to carry such molds, alternatively, between an operative engaging position with the injection cylinder and an inoperative non-engaging position; the improvement for such moving means comprising a platform, mold-retainers adjacent each end of the platform mounted to move mold sections toward and away from each other transversely of the platform, each mold-retainer having hook means extending to the other side of the platform, power means carried on said other side of the platform for limited relative movement longitudinally of the platform and adapted to releasably engage the hook means of each mold-retainer to effect the transverse movement thereof, and means to reciprocate the power means in the direction the length of the platform, whereby said limited relative movement of the power means provides a lost-motion period at each end of the stroke of the platform movement to permit the power means to leave the hook means of one mold-retainer and engage the hook means of the other mold-retainer before actual movement of platform begins.

8. The injection molding apparatus of claim 7 further including means responsive to the movement of the platform to actuate said transverse movement of at least one of said mold-retainers.

9. In injection molding apparatus including an injection cylinder, means to support a pair of molds, and means to shuttle the mold support means in order to carry such molds, alternatively, between an operative engaging position with injection cylinder and an inoperative non-engaging posiiton; the improvement for such shuttle means comprising a platform reciprocably movable in the direction of its length and stationed beneath the injection cylinder, a pair of platens for holding mold sections adjacent each end of the platform, one platen for each pair being fixed with the companion platen of each pair being adapted for movement toward and away from the fixed platen transversely of the platform, each movable platen having hook means extending beneath the platform and terminating in slot means, a fluid-operated cylinder carried beneath the platform for limited relative movement longitudinally of the platform having a piston rod adapted releasably to engage the hook means of each movable platen and move it toward and away from its mating fixed platen, thereby to close and open, respectively, the mold sections held by such platens, an arm extending from the bottom of the platform and fixed with respect to said fluid-operated cylinder for limited free movement relative to the platform, and means to reciprocate the platform through said arm, said limited free movement of the arm and cylinder enabling said piston rod to leave the hook means of one platen and engage the hook means of the other platen before actually moving the platform.

10. Injection molding apparatus including an injection cylinder comprising a body having an axially extending passage therethrough, said passage being relatively wide at one end to define a loading chamber and narrowing to a plunger section of the passage, plunger means adapted for reciprocating movement in said plunger section through said loading chamber, said plunger means and plunger section having matching cross-sectional configurations, said passage further having an enlarged area terminating in an exit, torpedo means disposed within the enlarged area leaving a relatively thin annular passage between it and said enlarged area, the volume of said annular passage being substantially equal to the volume of said loading chamber, heating means encircling said body, a resilient mounting for the cylinder adapted to permit limited axial travel of the body, a nozzle, means resiliently mounting the nozzle at the exit of the cylinder to accommodate backward movement of the nozzle into the body upon striking a mold or the like, whereby the injection cylinder may be operated at relatively low pressures and high heating efficiencies, hopper means mounted adjacent the injection cylinder and adapted to contain a supply of material to be injection molded, means responsive to the engagement of the plunger means with the injection cylinder to release a predetermined amount of material from the reservoir for introduction to said injection cylinder, a platform mounted beneath the injection cylinder for reciprocal movement in the direction of its length, mold-retainers adjacent each end of the platform mounted to move mold sections toward and away from each other transversely of the platform, each mold-retainer having hook means extending to the other side of the platform, power means carried on said other side of the platform adapted to releasably engage the hook means of each mold-retainer to effect said transverse movement thereof, and means to reciprocate the platform in the direction of its length to carry molds supported by said platform between an operative engaging position with the injection cylinder and an inoperative non-engaging position, said reciprocating means having a lost-motion period at each end of the stroke of the platform movement to permit said power means to leave the hook means of one mold-retainer and engage the hook means of the other mold-retainer before actual movement of the platform begins.

References Cited by the Examiner
UNITED STATES PATENTS

| | | | |
|---|---|---|---|
| 2,433,654 | 12/1947 | Dinzl | 18—30 |
| 3,002,229 | 10/1961 | Friederich | 18—30 |

J. SPENCER OVERHOLSER, *Primary Examiner.*

W. L. McBAY, *Assistant Examiner.*